United States Patent [19]

Spisak

[11] 4,357,053

[45] Nov. 2, 1982

[54] WHEEL TRIM ASSEMBLY

[76] Inventor: Edward G. Spisak, 35700 Oakwood La., Westland, Mich. 48185

[21] Appl. No.: 170,581

[22] Filed: Jul. 21, 1980

[51] Int. Cl.³ .............................................. B60B 7/00
[52] U.S. Cl. ................................ 301/37 R; 301/37 P; 301/108 A
[58] Field of Search ................. 301/37 R, 37 P, 37 C, 301/37 CD, 37 S, 108 R, 108 A, 108 S; 24/288, 289, 295

[56] References Cited

U.S. PATENT DOCUMENTS

| | | | |
|---|---|---|---|
| 181,541 | 8/1876 | Sanderson | 301/108 R |
| 1,845,323 | 2/1932 | Neuner | 301/108 R |
| 2,217,086 | 10/1940 | Whitacre | 301/37 R |
| 2,819,929 | 1/1958 | Hunt | 301/108 R |
| 3,833,266 | 9/1974 | Lamme | 301/37 R |

FOREIGN PATENT DOCUMENTS 2111187 10/1971 Fed. Rep. of Germany ... 301/108 S

*Primary Examiner*—H. Grant Skaggs
*Attorney, Agent, or Firm*—Fisher, Gerhardt, Crampton & Groh

[57] ABSTRACT

A wheel trim assembly including metal retainers for bitingly engaging the sides of wheel attaching nuts to maintain the wheel trim in position on the wheel in which the metallic retaining members are supported within a plastic hubcap by the resiliency of the retaining members acting to maintain portions thereof slidably disposed in guide holes in the side walls of the cap for engagement with the wheel nuts.

8 Claims, 6 Drawing Figures

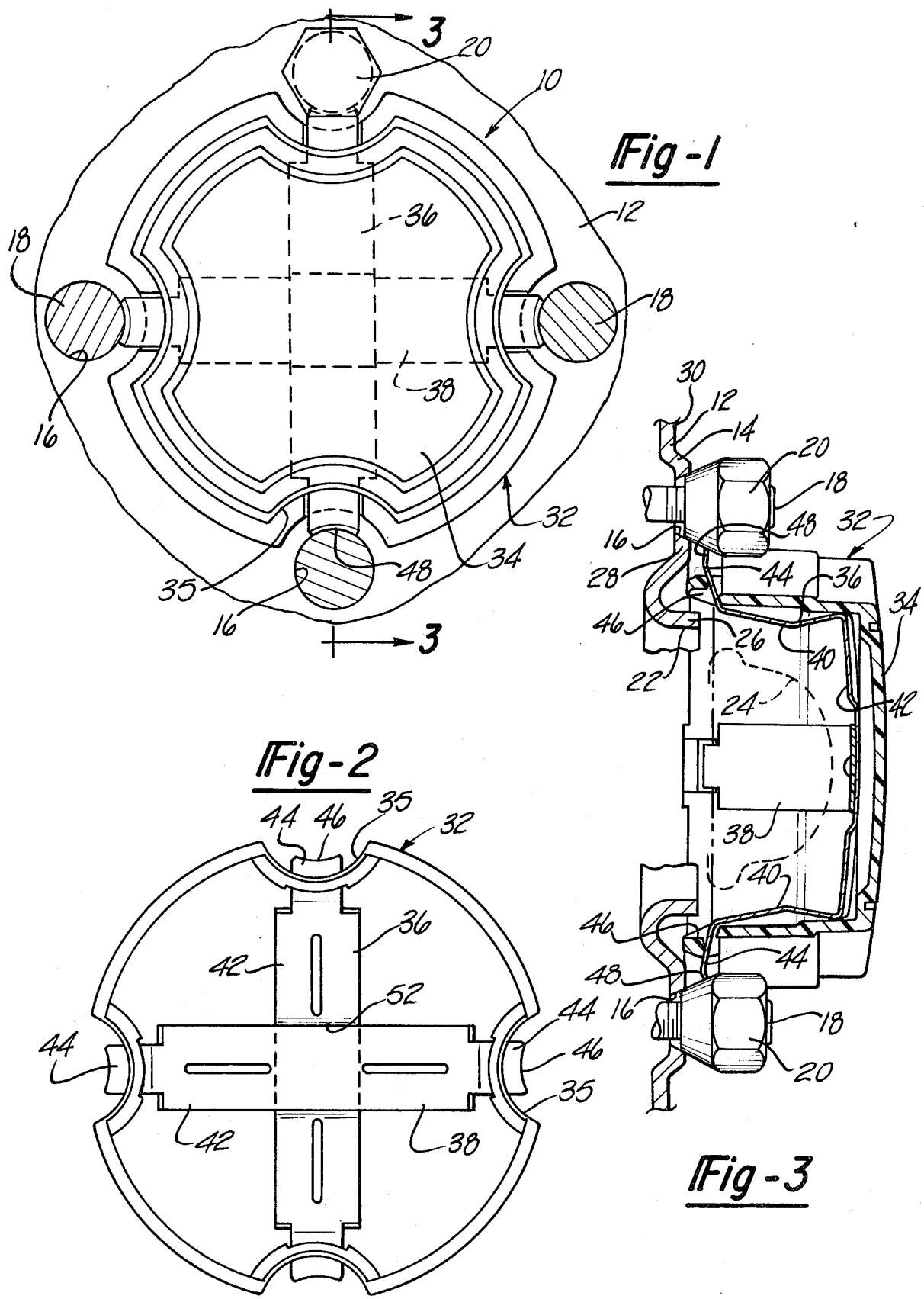

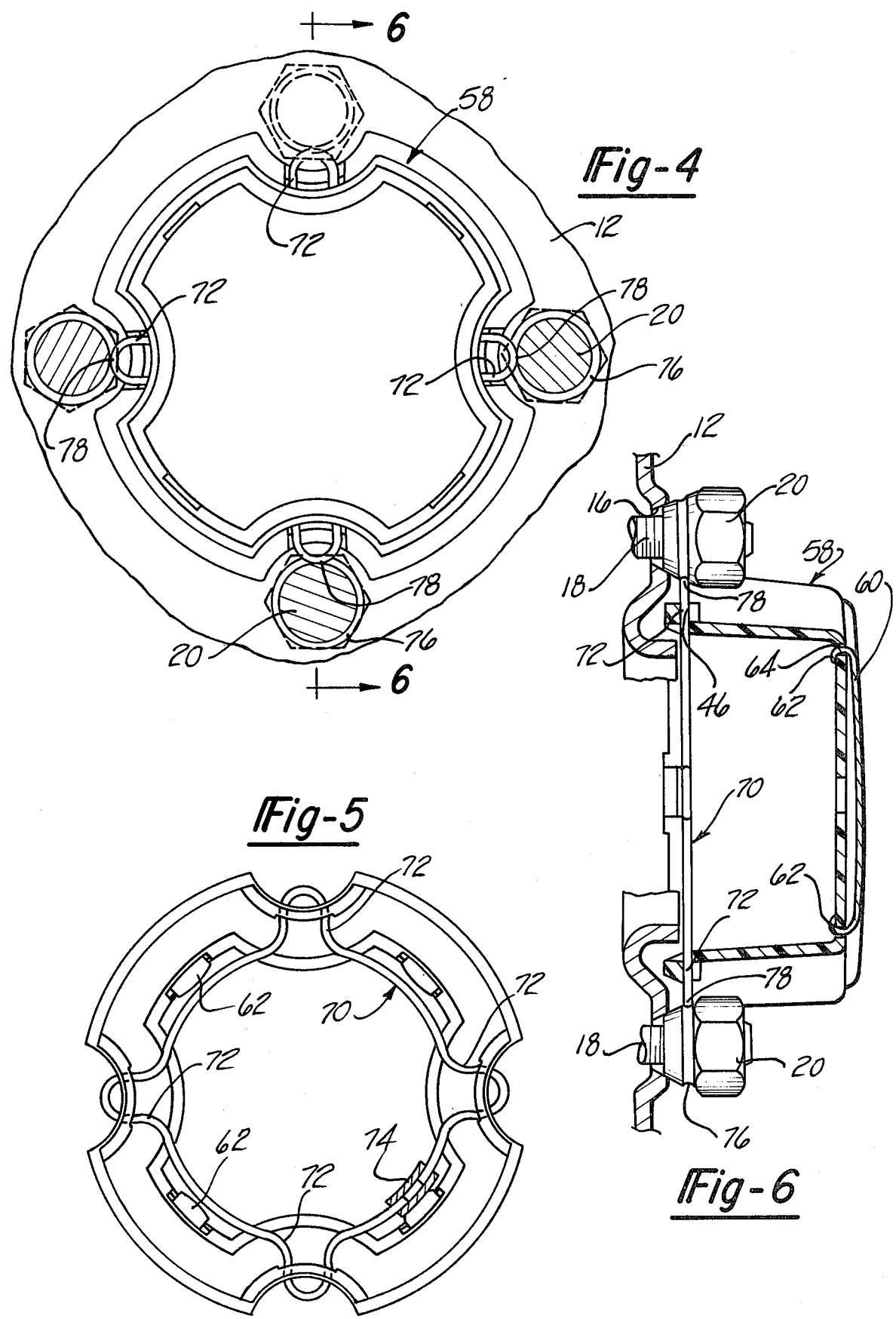

WHEEL TRIM ASSEMBLY

This invention relates to decorative wheel trim assemblies for use on automotive vehicle wheels, and more particularly to a retaining arrangement for holding the trim assembly on the wheel.

Wheel trim such as ornamental caps which are used to cover a portion of the wheel are difficult to maintain in position on the wheel because the wheel itself is subject to complex loading and stresses tending to temporarily deform the wheel during operation on road surfaces. In addition, the wheel trim itself must support retainers for holding the wheel trim in position during all operating conditions. Such retainers are subject to high loads which are transferred to the fastening arrangements by which the retainers are mounted to the wheel trim. The problem is particularly aggravated when the wheel trim is made of plastic material which requires the use of special fasteners to secure the retaining system relative to the wheel trim member.

It is an object of the invention to provide a wheel trim assembly with an improved retainer arrangement that removably maintains the wheel trim in position on the wheel without transmitting loads to the wheel trim itself.

Another object of the invention is to provide a wheel trim assembly having a retainer arrangement that absorbs the loads of the wheel and the retainer without transmitting any of such loads to the wheel trim.

Still another object of the invention is to provide a retainer arrangement for wheel trim in which the resiliency of the retainers is used, not only to hold the wheel trim relative to the wheel, but also, to hold a retainer relative to the wheel trim.

The objects of the invention are accomplished by a wheel trim assembly wherein a cup-shaped trim member is provided with retaining members made of spring-like metal. In one embodiment of the invention, the retaining members are made of metal strips and include a pair of diametrically opposed retainer elements. A pair of such members is used to engage diametrically opposed wheel attaching nuts. In another embodiment of the invention, the retaining member is a single length of resilient wire bent in a circle on the interior of the cup-shaped member with a plurality of retainer elements projecting radially outwardly. In both embodiments of the invention, the retainer elements resiliently resist movement relative to each other and to the cup-shaped member. Also, in both embodiments the retaining members are supported within the cup-shaped trim member so that the retaining elements project through the wall of the cup-shaped member to engage wheel securing nuts. The load from one retainer element and nut is transmitted radially to oppositely disposed retaining elements. In addition, the retaining elements in both embodiments of the invention project through openings in the cup-shaped side wall and the resiliency of the retaining member maintains the elements in the openings and acts to secure the retaining members relative to the cup-shaped trim member. No additional fasteners are used to secure the retaining members making it possible to easily remove and replace retaining members if that should become necessary.

These and other objects of the invention will become more apparent from the following description of the two embodiments of the invention and from the drawing in which:

FIG. 1 is a plan view of a wheel trim assembly embodying the invention shown in position relative to a vehicle wheel, only a part of which is shown;

FIG. 2 is a view of the interior of the cup-shaped wheel trim assembly seen in FIG. 1;

FIG. 3 is a cross sectional view of the wheel trim assembly shown in position relative to a portion of a vehicle wheel;

FIG. 4 is a plan view similar to FIG. 1 of another embodiment of the invention;

FIG. 5 is a view of the interior of the wheel trim assembly seen in FIG. 4; and

FIG. 6 is a cross sectional view of the wheel trim assembly taken on line 6—6 in FIG. 4.

A wheel trim assembly including the improved retaining arrangement embodying the invention is designated generally at 10 and is adapted for connection to the outboard side of a vehicle wheel, a portion of which is indicated at 12 in FIGS. 1 and 3. The wheel 12 is of the usual automotive vehicle type having a spider or disc portion 14 with a plurality of stud receiving openings 16 through which studs 18 extend to receive wheel fastening nuts 20. Such fastening of a vehicle wheel to a hub is conventional. The stud receiving openings 16 are disposed on an annular bolt circle spaced radially outwardly from an opening 22. The opening 22 is in alignment with an axle portion, not shown, the end of which is conventionally covered by a grease cap indicated in broken lines at 24.

The opening 22 is surrounded by an axially extending annular flange 26. Each of the stud openings 16 radially outward of flange 26 is formed in a pad 28 elevated slightly in an axial direction relative to surrounding face portions 30 of the wheel spider or disc 14.

The wheel trim 10, sometimes called a hubcap, includes a generally cup-shaped cap 32 preferably made of plastic material and having an ornamental outer surface 34. The cap 32 is intended to be disposed coaxially of the wheel 12 to cover the grease cap 24 and the annular flange 26 of the wheel 12. The cap 32 is provided with cut outs or recesses 35 to clear the nuts 20.

The cap 32 is held in its position relative to the wheel 12 by retaining means which include a pair of retaining members 36 and 38. Each retaining member 36 or 38 is generally U-shaped having a pair of legs 40 joined together by a diametrically extending bight portion 42. The legs 40 extend axially from the bight portion 42 and their axial inner ends are provided with retainer elements 44. The retainer elements 44 are slidably received in guide means in the form of openings 46 formed in the side wall of the cap 32 so that the retainer elements 44 project radially outwardly of the cap 32. The radial outer ends of the retainer elements 44 are provided with blade portions 48 which bitingly engage the exterior surface of the wheel attaching nuts 20. The retaining members 36 and 38 are made of spring like steel so that the blades 48 are biased radially outwardly relative to each other to engage the sides of the beveled seating portion 50 of mounting nuts 20. When the wheel trim 10 is not attached to a wheel 12, the leg members 40 are biased radially outwardly relative to each other to engage the inner side walls of the cap 32 to maintain the retaining members 36 and 38 within the cup-shaped cap 32.

As best seen in FIG. 2, one of the retaining members 36 has a centrally indented portion at 52 to receive the bight 42 of the other of the retaining members 38. In this manner, the retaining members 36 and 38 are disposed so that their respective bight portions 42 are disposed transversely of each other and so that the retaining elements 46 and 48 are disposed in substantially the same plane extending generally transversely to the axis of the wheel 12.

In attaching the wheel trim 10 to the wheel 12, the cap 32 is brought into alignment with the axis of the wheel, and upon axially inward movement, the blade portions 48 engage the wheel attaching nuts 20 and act as cams to deflect the legs 40 radially inwardly until the cap 32 comes into engagement with the wheel disc 14 and the retaining elements move into engagement with the beveled portions 50 of mounting nuts 20.

In the attach position of the wheel trim assembly 10 loads from one of the retaining elements 44 acting against one of the wheel attaching nuts 20 is transmitted to the diametrically opposed nut 20 through the respective retaining member 36 or 38 without any substantial portion of such loads being imposed on the wheel cap 32. Also, the loads on one retaining member 36 are transmitted substantially independently of the loads on the other retaining member 38. Since the loads from the wheels to the trim assembly are absorbed by the retaining members 36 and 38, it makes it unnecessary to provide additional thickness or reinforced portions in the walls of the cap 32 to receive fasteners or the like. This makes it possible to form an ornamental or decorative cap having relatively thin wall sections as compared with caps using other forms of retention systems.

Another embodiment of the invention is shown in FIGS. 4, 5 and 6 wherein an ornamental cap 58 is substantially identical to the cap 32 described in connection with the embodiments in FIGS. 1 through 3. The cap 58 differs from the cap 32 in that it has an ornamental metal plate or medallion 60 fastened to the remainder of the cap 58 by means of tabs 62 passing through openings 64 in the cap 58. The cap 58 also differs in the form of retention system by which it is secured to the vehicle wheel 12 but in all other important aspects is the same as the cap 32.

The retention system by which the cap 58 is held relative to the wheel 12 is in the form of a retaining member 70. The retaining member 70 is made of a single elongated resilient wire such as a relatively heavy gauge piano wire. The wire is bent into a generally circular form interrupted by a plurality of loops 72 to form radially extending retaining elements which are disposed for movement in guides formed by the openings 46 in the cap 58.

The two ends of the wire retaining member 60 may be joined together by a metal clip 74 seen in FIG. 5 or by seating in a groove molded in the plastic cap but not shown.

The projecting loops 72 have tip portions 76 that act in much the same manner as the blades 46 in the prior embodiment. The tip portions 76 resiliently engage annular grooves 76 formed on each of the wheel attaching nuts 20 as best seen in FIG. 6. Each of the loops 72 is biased radially outwardly to slide in its associated opening 46 to engage the groove 76 when the cap 58 is in its attached position on the wheel. In the detached position, the loops 72 project a sufficient distance from the openings 46 to insure that the member 70 remains in position and attached to the cap 58. The load from any one of the wheel attaching nuts 20 is transmitted through the associated loops 72 to the retaining member 70 and is opposed by other of the loops 72 in engagement with their respective wheel attaching nuts 20. In this manner, the retaining member 70 absorbs the loads of attachment and from the wheel without imposing loads on the cap itself.

The embodiment in FIGS. 4 through 6 is illustrated in connection with a wheel having four wheel attaching nuts 20 but the single wire retaining element 70 makes the construction of the embodiment in FIGS. 3 through 6 adapted for nut spacings employing an odd number of nuts, for example 5. The embodiment in FIGS. 1 through 3 is more particularly adapted for wheel arrangements having wheel mounting nuts 20 disposed in diametrically opposed pairs.

A wheel trim assembly has been provided wherein the wheel trim member is fastened on the outboard side of a vehicle wheel by retaining members which engage the side surfaces of wheel attaching nuts. The retaining members are resilient and exert a force against each nut with the remaining nuts forming reaction points so that the loads are transmitted independently of the ornamental cap itself. In addition, the resiliency of the retaining members is used to mount the retaining member so that it remains a part of the wheel trim assembly even when the wheel trim is not attached to the wheel.

The embodiments of the invention in which an exclusive property or privilege is claimed are defined as follows:

1. An ornamental wheel trim assembly for attachment to a vehicle wheel having an outer face with a plurality of uniformly spaced wheel securing nuts located on a circle concentric with said wheel, said wheel trim assembly comprising: a cup-shaped trim member adapted to be disposed axially of the wheel, a retaining member disposed in the cup-shaped member, guide means uniformly spaced in the side walls of the cup-shaped trim member to slidably receive and maintain said retaining member mounted relative to the cup-shaped member, wherein said retaining member is generally U-shaped with a diagonally extending bight portion and a pair of legs extending axially from said bight portion, said legs being disposed adjacent the wall of said cup-shaped member and said bight portion being disposed adjacent the bottom of said cup-shaped member, said retaining member having end portions for engagement with wheel securing nuts to detachably hold the cup-shaped member relative to the wheel.

2. The ornamental wheel trim assembly of claim 1 wherein said guide means are openings formed in said opposed walls to slidably receive said retainer member.

3. The ornamental wheel trim assembly of claim 1 wherein said retaining member is biased radially outward to engage the inner walls of said cup-shaped member and maintain said retaining member in said openings to form the sole means of supporting said retaining member on said cup-shaped member.

4. The ornamental wheel trim assembly of claim 1 wherein said retaining member is formed of spring-like material.

5. The ornamental wheel trim assembly of claim 1 wherein a pair of retaining members are disposed relative to said cup-shaped member with the bight portion of one retaining member being disposed transversely to the bight portion of the other retaining member.

6. The ornamental wheel trim assembly of claim 5 wherein one of said bight portions is recessed to receive the diagonal member of the other of said retaining members.

7. An ornamental wheel trim assembly for attachment to a motor vehicle wheel having a plurality of uniformly spaced wheel mounting fasteners arranged on a circle coaxial of the wheel axis, comprising; a cup-shaped trim member having a bottom and sidewalls, retainer means including a pair of retainer members, each of the retainer members being U-shaped and having a cross member and a pair of legs extending from the cross member and conforming, respectively, to the bottom and diametrically opposite walls of the cup-shaped member, the pair of legs being flexible relative to the cross member and to each other and terminating adjacent the open end of said cup, a retainer element projecting radially from the ends of each of the legs, guide means formed in the walls of the cup-shaped member and slidably receiving the retainer elements to project from the exterior of the cup-shaped member and releaseably engaging the wheel mounting fasteners.

8. The ornamental wheel trim assembly of claim 7 wherein the retainer elements are flexible relative to each other and resistance to flexure is transmitted to the diametrically opposed retainer element independently of the structure of said cup-shaped member.

* * * * *